March 19, 1968  J. A. SAFFIR  3,373,743

DISPOSABLE HYPODERMIC SYRINGE

Filed Nov. 29, 1963  2 Sheets-Sheet 1

INVENTOR.
JACOB A. SAFFIR
BY
ATTORNEY

March 19, 1968   J. A. SAFFIR   3,373,743
DISPOSABLE HYPODERMIC SYRINGE
Filed Nov. 29, 1963   2 Sheets-Sheet 2

INVENTOR.
JACOB A. SAFFIR

By
ATTORNEY

United States Patent Office 3,373,743
Patented Mar. 19, 1968

3,373,743
DISPOSABLE HYPODERMIC SYRINGE
Jacob A. Saffir, Los Angeles, Calif., assignor to The Dentists' Supply Company of New York, York, Pa., a corporation of New York
Filed Nov. 29, 1963, Ser. No. 326,988
2 Claims. (Cl. 128—218)

The present invention pertains to disposable hypodermic syringes and, more particularly, to the type which are filled with medicament of one kind or another and then packaged aseptically in condition for immediate use when removed from the package, without requiring the cylinder or barrel of the syringe to be filled by aspiration from a source of supply.

A number of different types of disposable syringes presently are available, especially those which are not filled with medicament, such syringes being packaged in aseptic condition and being ready for instant use when removed from the package, but requiring the barrel or cylinder of the syringe to be filled from an appropriate supply, such as a bottle or other form of container. This presents somewhat of a nuisance as distinguished from a syringe already filled with medicament and in aseptic condition and ready for instant use after being removed from a sterile package in which it has been enclosed.

The production, and especially the storage, of a syringe having a barrel or cylinder filled with medicament presents certain problems, however, particularly when stored over a period of time. It has been found, for example, that hypodermic needles and coupling means therefor, even though made of stainless steel or other equally non-corrosive type of metal, there nevertheless are certain medicaments which will react unfavorably with such metals, even somewhat corrosively, whereby the nature of the medicament is changed and the discharge passage through the needle becomes either restricted or completely closed.

In an effort to obviate the aforementioned difficulties, efforts recently have been made to provide, in the discharge end of the barrel or cylinder of the syringe, an auxiliary closure somewhat of a diaphragm nature capable of being burst upon the application of pressure upon the plunger, or said diaphragm being provided with a free-formed slit or other form of automatically closable opening therein, whereby upon the application of pressure upon the plunger of the syringe, medicament is permitted to flow through said preformed opening. At the end of the discharge from the syringe, and assuming that all of the contents have not been exhausted therefrom and an additional injection may be contemplated within a short period of time, such type of closure is intended to seal the remaining contents of the syringe from the needle, even though a certain amount of medicament is present in the needle.

One difficulty which has been found with the use of such types of diaphragms, however, has resided in the fact that when the syringe is subjected to substantial shaking, such as sometimes is necessary in regard to certain medicaments, or upon dropping the syringe, or even from aging, leakage of the medicament through such diaphragm-type of auxiliary sealing means can result and, such leakage, no matter how small, may produce unfortunate results, especially if such leakage is not detected at the time it occurs and, for example, the syringe happens to be stored thereafter for a substantial period of time, or, in the event the medicament may be particularly reactive with the metal of the needle, even a relatively short period of storage can produce undesirable results through such contact of the medicament with the needle or its metallic coupling means.

It is the principal object of the present invention to provide a preferably disposable hypodermic syringe of the type intended to be loaded at the factory with medicament and stored in aseptic condition until ready for use by packaging the same in hermetically sealed containers, formed, for example, from sheet-type, impervious, pliable synthetic resin, the discharge end of the cylinder of the syringe having an imperforate closure means mounted therein, the periphery of which normally is in sealing engagement with the inner walls of the cylinder of the syringe, but at least a portion of the periphery of said imperforate closure means being contractable from said walls of the cylinder to permit passage of the contents of the cylinder to the discharge needle, or, conversely, to permit aspiration of material through the needle and into the cylinder of the syringe.

Another object of the invention is to provide a number of different embodiments of means for effecting contraction of at least a portion of the periphery of said imperforate closure means from the walls of the cylinder, as referred to in the above-described object, certain of the embodiments of contracting means being mounted on the interior of the cylinder of the syringe adjacent the discharge end thereof, while others are mounted on the closure means per se and are coactable with certain interior surfaces of the cylinder of the syringe.

A further object of the invention is to provide an imperforate closure means of the type referred to in the above-described objects, which preferably is made of flexible material, such as rubber, pliable synthetic resin, or the like, and is readily capable of being deformed so as to effect contraction of at least a portion of the periphery thereof from engagement with the interior walls of the cylinder of the syringe, as described above.

Still another object of the invention is to form the periphery of the imperforate closure means with various embodiments of configuration respectively having different characteristics, but, in general, contributing to the ability of the closure means to have at least a portion of the periphery thereof contractable from engagement with the interior walls of the cylinder of the syringe, thereby supplementing the flexible nature of the closure means for purposes of permitting passage of material past the same incident to either being aspirated into the cylinder, or discharged therefrom into the needle of the syringe.

A still further object of the invention is to provide variations in thickness in the imperforate closure means, the same generally being thinner in the central portion than at the periphery thereof, thereby also to facilitate distortion or flexing of the closure means to contract at least a portion of the periphery thereof from engagement with the inner surface of the cylinder of the syringe for the above-described purposes.

Details of the foregoing objects and of the invention, as well as other objects thereof, are set forth in the following specification and illustrated in the accompanying drawings comprising a part thereof.

Figure 6:
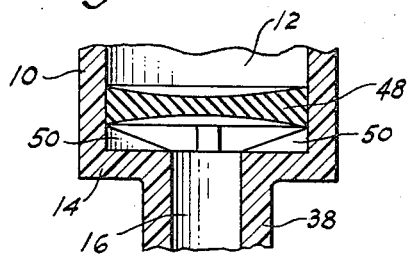
FIG. 6 is a fragmentary, longitudinal sectional view of the discharge end of the cylinder body of the syringe and showing one embodiment of imperforate closure means therein mounted in sealing engagement with the inner walls of the cylinder, one embodiment of contracting means for the closure means also being shown in said figure.
Figure 7:
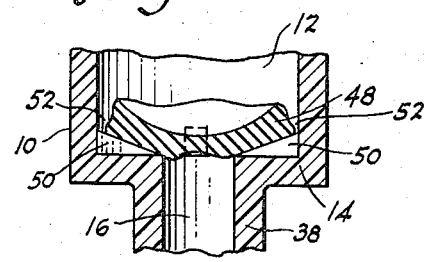
FIG. 7 is a view similar to FIG. 6, but showing the closure means in slightly exaggerated contracted condition as when the contents of the cylinder are being discharged through the forward, discharge end of the cylinder for passage to the needle of the syringe.
Figure 8:
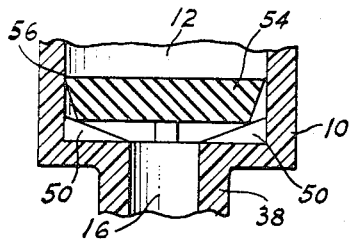
Figure 9:
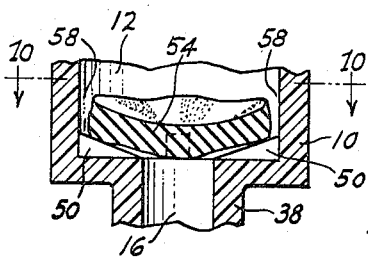
Figure 10:
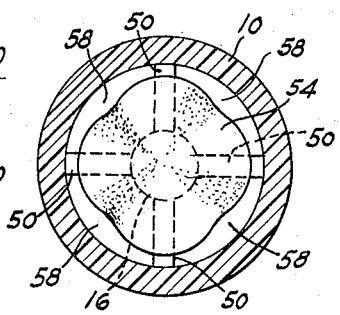

FIGS. 8, 9 and 10 respectively are fragmentary vertical sectional views similar to FIGS. 6 and 7, but illustrating another embodiment of shape of imperforate closure means from that shown in FIGS. 6 and 7, FIGS. 8 and 9 respectively showing the closure means in sealing and contracted condition, the showing in FIG. 9 being somewhat exaggerated, while FIG. 10 is a transverse sectional plan view, as seen on the line 10—10 of FIG. 9.

Figure 11:
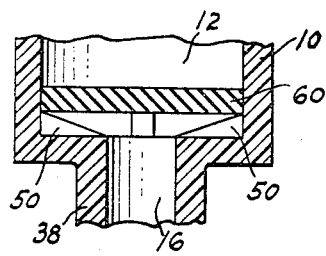
Figure 12:
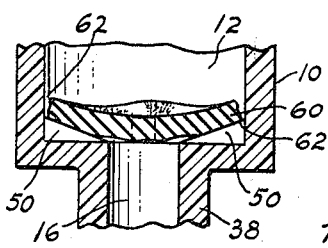

FIGS. 11 and 12 are fragmentary vertical sectional views similar to FIGS. 8 and 9, but showing still another embodiment of shape of imperforate closure means respectively in sealing and contracted condition relative to the inner walls of the cylinder of the syringe, the condition represented in FIG. 12 also being somewhat exaggerated.

Figure 15:
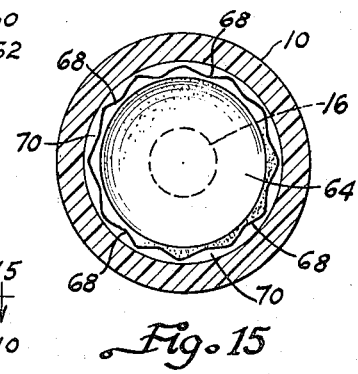
Figure 13:
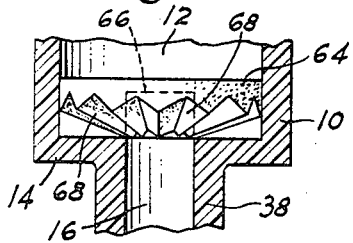
Figure 14:
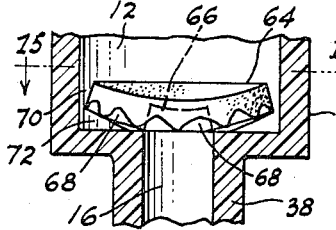

FIGS. 13, 14 and 15 respectively are views similar to FIGS. 8, 9 and 10, but illustrating still another embodiment of imperforate closure means, as well as another embodiment of means operable to distort and thereby contract the periphery of the closure means to effect passage of material past at least a portion of the periphery of the closure means, the condition shown in FIG. 14 being somewhat exaggerated, while FIG. 15 is a transverse sectional plan view taken on the line 15—15 of FIG. 14.

Figure 18:
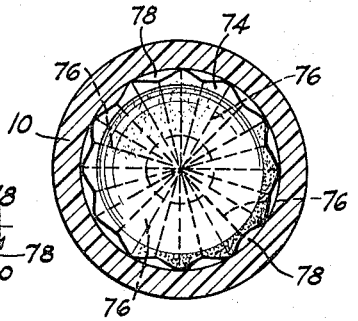
Figure 16:
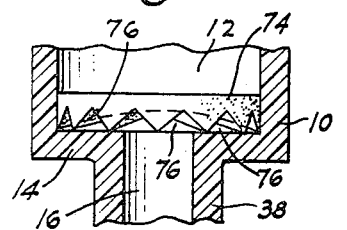
Figure 17:
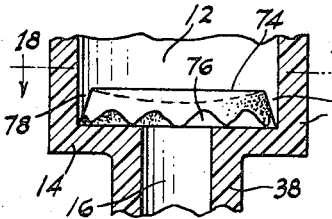

FIGS. 16, 17 and 18 respectively are similar to FIGS. 13, 14 and 15, except that they illustrate still another embodiment of closure means using similar basic principles to the embodiment shown in FIGS. 13–15, the view illustrated in FIG. 17 being somewhat exaggerated, while FIG. 18 is a transverse sectional plan view, as seen on the line 18—18 of FIG. 17.

Figure 1:
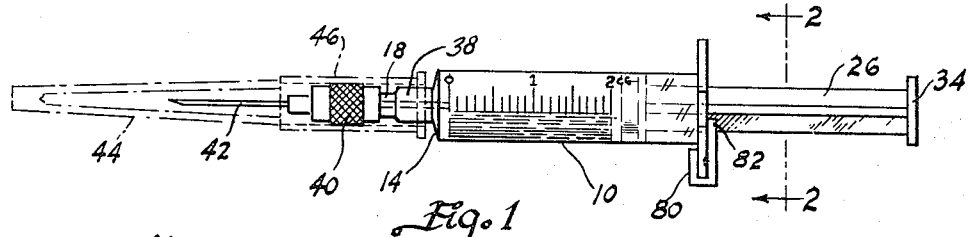
FIG. 1 is a side elevation showing an exemplary disposable hypodermic syringe illustrating, in phantom, a shield over the aseptic needle of the syringe and the body of the syringe embodying the principles of the present invention.

An exemplary illustration of a disposable hypodermic syringe of the type to which the present invention is applicable is illustrated, in its entirety, in FIG. 1, but it is to be understood that said illustration primarily is for illustration purposes only and is not to be regarded as restrictive. Referring to said figure, and also FIGS. 2 and 3, it will be seen that the syringe comprises a tubular body or cylinder 10 having a smooth cylindrical cavity 12 therein of uniform diameter. The body 10, in many types of syringes, is formed from glass and such material is suitable for use in the present invention. However, particularly since the invention primarily is concerned with disposable hypodermic syringes, it is proposed preferably to form the body 10 from any one of a number of suitable synthetic resins, by molding. Molding techniques also offer relatively inexpensive ways of precisely forming an end wall 14 having a discharge opening or exit 16 therein and also provided with an axial extension 18 provided with a discharge opening 20, which communicates with and is coaxial with the discharge opening 16, the combined discharge openings 16 and 20 actually comprising exit or discharge means for the body 10. In the preferred construction, the end wall 14 also is provided with a transversely extending shoulder surface 22.

The end of the tubular body 10 opposite the discharge end is intersected by the open outer end of cylindrical cavity 12 for the reception of a piston-like plunger 24, which preferably is molded of suitable compressible material, such as rubber, flexible synthetic resin, or the like, and has an outer diameter slightly greater than the diameter of cavity 12, whereby longitudinal movement of the plunger 24 relative to the cavity 12, while capable of being accomplished with relatively little physical exertion, nevertheless is of a fractional, wiping nature. Movement of the plunger 24 in opposite directions is effected by means of a plunger rod 26, which inexpensively may be formed by molding the same from synthetic resin, for example, and for purposes of strength and guidance, as well as saving of material, said rod may be formed cross-shaped in cross-section, as clearly shown in FIG. 2. Movement of the plunger 24 away from the exit opening of the body 10 will cause aspiration of material through said exit opening and into the body 10, while movement of the plunger 24 oppositely, toward the exit opening, will cause discharge of material within the body through said exit opening.

Figure 3:
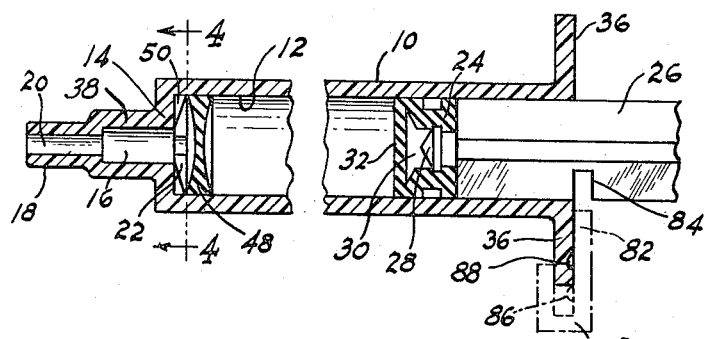
FIG. 3 is a longitudinal, fragmentary sectional view, partly foreshortened to condense the illustration, and showing cylinder body, plunger, and imperforate closure means arranged in operative position with respect to each other.
Figure 4:
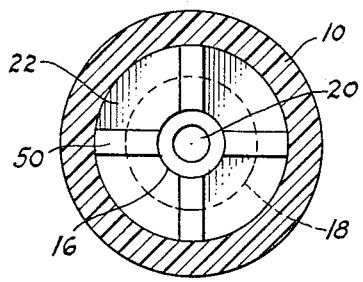
FIG. 4 is a transverse sectional view shown on the line 4—4 of FIG. 3 and illustrated on a larger scale than in FIG. 3.

As is especially evident from FIG. 3, a connecting head 28 is formed on the inner end of plunger rod 26 for engagement with a complementary opening formed in the outermost end of plunger 24 so as effectively to secure the plunger to its plunger rod. To facilitate connection of the plunger to its rod, however, the outer end of the head 28 preferably is conical, as clearly shown in FIG. 3. Also, the complementary opening in plunger 24, which receives the connecting head 28, if desired, can be part of an additional cavity 30, which is formed in plunger 24, thereby defining a pressure wall 32 having an operative face in engagement with the medicament or other contents of the body 10. Inasmuch as the plunger 24 preferably is molded from flexible material, the wall 32, likewise, will be flexible and the provision of the cavity 30 will permit flexing of the wall 32 suitably to accommodate expansion or contraction of the contents of the body 10, especially when the syringe is stored for substantial periods of time and under different temperature conditions. This aspect of the construction is of importance in regard to sealing means, to be described hereinafter, located adjacent the exit end of the body 10.

To facilitate the operation of plunger 24, the outer end of plunger rod 26 preferably is provided with a conventional thumb button 34, the body 10, adjacent its open end opposite the exit end also is provided with finger-engageable flanges 36, whereby, for example, the index and middle finger respectively may be engaged under said flanges, while the thumb engages the thumb button 34, as in conventional practice, to effect discharge of the contents from the body 10.

The axial extension 18, which has a slightly smaller outer diameter than the intermediate end portion 38, frictionally and firmly receives a connecting socket member 40, to which a conventional hypodermic needle 42 is affixed, said needle communicating with the discharge openings 16 and 20 in the exit end of the body 10.

In accordance with the principles of the present invention, and particularly where the invention is applied to a hypodermic syringe of a disposable type and the cavity 12 of which is filled to a desired extent, at least, with medicament, whereby the syringe is ready for instant use without having to be filled from a supply source at the time of use, the hypodermic needle 42 is in sterile condition and is applied to the exit or discharge end of the hypodermic body 10 under sterile conditions. The filling of the body with medicament, likewise, is accomplished under sterile conditions. To preserve the aseptic and sterile conditions of the needle 42, a suitable shield or sheet member 44, which is elongated and closed at the outer end, but provided with an enlarged open head 46, is applied to the needle 42 and the socket member 40 by head 46 firmly and frictionally engaging socket member 40 in a sealing manner, which will maintain the needle 42 in sterile, aseptic condition until ready for use.

When the hypodermic needle is to be used, it is only necessary to quickly pull the shield member 44 from the needle and the same then is ready for insertion to apply the contents of the syringe.

Even though the needle 42 and the socket member 40 thereof are formed from relatively corrosion-free material, such as stainless steel, chrome plated base metal, or the like, it, nevertheless, has been found that if at least certain medicaments and other types of material commonly injected by means of a syringe, are placed in contact with such needles and socket members for any sustained period of time, such as during storage in a warehouse, upon a store shelf, or the like, reaction takes place between the material and the metal of the needle and socket member. This not only results in a change in nature of the medicament through such reaction, which sometimes may produce dangerous results if injected, but corrosion of the usual, relatively small sized opening of the hypodermic needle can cause either partial or complete clogging thereof. Accordingly, it is the object of the present invention to obviate such unsatisfactory conditions and results by providing a diaphragm-type closure 48 within the body 10 adjacent the exit end thereof. The present invention contemplates a number of different embodiments of closures of this type, of which closure 48, which is illustrated specifically in FIGS. 3, 6 and 7, is only one form, other embodiments thereof being illustrated in subsequent figures and described in detail hereinafter. In general, however, while these various embodiments are for the same general purpose, namely, of preventing premature contact between the contents of the tubular body 10 and the hypodermic needle or its socket member, the various embodiments include differences which have certain advantages over each other, whereby the same are not to be considered as the full equivalent of each other.

The essential feature of all of the closures illustrated and described herein is that they are imperforate. The peripheral surfaces of all of said closures provide at least continuous line contact or continuous band-like contact with the inner cylindrical surface of the tubular body 10. Said imperforate closures preferably are manufactured by suitable molding from appropriate rubber compounds, flexible or pliable, and preferably slightly compressible, synthetic resins, or similar materials capable readily of being deformed, and especially contracted at portions of the periphery thereof for the purpose of permitting thereby of fluids, or other contents of a hypodermic syringe, which are to be moved past said closure means when either being aspirated into the body 10, or discharged therefrom.

Figure 5:
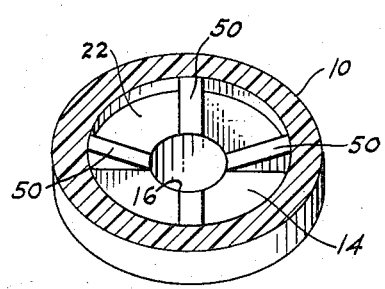
FIG. 5 is a perspective view of that portion of the discharge end of the syringe, which is shown in FIG. 4.

Considering the embodiment of the closure 48 shown in FIGS. 3, 6 and 7, it will be seen that said enclosure is thinner at the central portion thereof than at its periphery. Said thinner central portion preferably is formed by making both of the opposite surfaces of the closure member concaved, as clearly shown in FIGS. 3 and 6. Particularly with reference to movement of the plunger 24 toward the discharge end of the body 10 to discharge material therefrom, means are provided to facilitate distortion of the closure member 48 from its normal shape and condition, especially to contract at least a portion of the periphery thereof from engagement with the interior walls of the body 10. In accordance with several embodiments of the invention, such means to insure said distortion or deformation of the closure member comprise a series of radially extending projections 50 of varying height, which, for convenience of manufacture, may be integrally molded to the end wall 14 and lower portions of the inner side walls of the body 10 at the time the body, end wall 14, and end portions 18 and 38 are formed. If desired, however, the projections 50 may be made initially as separate members and then affixed by cementing, or the like, to the interior of the body 10 adjacent end wall 14. As will be seen particularly from FIGS. 5 through 7, the projections 50 have outermost sloping surfaces which extend inwardly toward the axis of the body 10 and inwardly toward discharge opening 16. As illustrated, there are four such projections 50, but such illustration is not to be regarded as restrictive. Actually, it is conceivable that the invention may operate satisfactorily with only a single projection, but at least a plurality of opposed projections is recommended, especially for purposes of providing a number of locations where the periphery of the closure member 48 will separate from the inner wall of body 10 when disorted and the periphery is contracted.

As has been indicated above, when pressure is placed upon the contents of the cylindrical cavity 12 by pressure being applied to plunger 24, and it being understood that the contents of the cavity 12 normally will be in engagement with the face of closure member 48, which is opposite the discharge opening 16, the central portion of closure member 48 will be moved toward the opening 16, while the periphery of the closure becomes somewhat crenelated and curving of the closure member 48 toward exit opening 16 will not only distort the closure, but also will contract at least portions of the periphery thereof, which are adjacent the projections 50, away from the inner side walls of the body 10, as shown somewhat diagrammatically and possibly in exaggerated manner in FIG. 7. It thus will be seen that one or more passages 52 will be formed through which the contents of the cavity 12 may pass from said cavity, through the spaces between projections 50, which communicate with discharge opening 16, and ultimately through the needle 42. Immediately upon release of the pressure upon plunger 24, the memory of the material from which the closure 48 is formed will quickly restore the closure substantially to the shape thereof shown in FIGS. 3 and 6, whereupon the remaining contents, if any, in cavity 12, will be preserved in aseptic condition, although, by this time, there will be some of the fluid or other types of contents within the discharge opening 16 and additional discharge opening 20 communicating therewith, as well as within the needle 42, but at least the contents of cavity 12 will not be contaminated.

Depending particularly upon the composition of the material from which the above-described closure member 48 is formed, the thickness of the same in relation to the stiffness or flexibility of said member, and the general ability of the member to contract at least partially from the inner side walls of the cavity 12 of the body 10, it is conceivable that different configurations of the peripheral surfaces of the closure member, as well as different cross-sectional shapes thereof, might be more advantageous than the shape of the peripheral surface or cross-sectional shape of the closure member 48. Accordingly, the present invention, in FIGS. 8, 9 and 10, illustrates an additional configuration of closure member, while in FIGS. 11 and 12, a still further configuration is illustrated.

Referring to the embodiment illustrated in FIGS. 8–10, it will be seen that the body 10 and projections 50 are the same as in the embodiment specifically shown in FIGS. 3–7. However, the closure member 54, while being formed of the similar class of material as above-described closure member 48, is provided with a periphery that is frusto-conical, whereby a line contact 56 is made thereby with the surface of cylindrical cavity 12, as shown in FIG. 8. It will be understood that the diameter of the upper surface of the closure member 54 is slightly greater than the diameter of cavity 12, whereby there will be slight compression of the closure member 54 incident to inserting the same into its operative position, as indicated in exemplary manner in FIG. 8, thereby affording a continuous peripheral seal between closure member 54 and the cavity 12.

As also will be seen from FIG. 6, the upper surface thereof preferably is concave when the closure member is in its normal, operative position, and the lower surface thereof preferably is substantially flat, whereby the central portion of the closure member, as in regard to the preceding embodiment, is thinner than the peripheral portion thereof. Due to the line contact 56 between the closure member and the walls of cavity 12, when pressure is exerted against the upper, concave surface thereof by imposing force upon plunger 24, as in regard to the embodiment illustrated in FIGS. 1–7, the closure member 54 will be distorted by engagement of its periphery with the projections 50, and especially by the contraction of the upper portion of the periphery of the closure member which was in line contact engagement with the inner surface of cylindrical cavity 12, a discharge passage 58 quickly will be produced between the closure member and cavity wall, at least between each successive pair of projections 50, as illustrated somewhat in exaggerated manner in FIG. 10. Upon release of the pressure exerted by plunger 24, the inherent resiliency of the closure member 54 will enable it to assume its normal position, as shown in FIG. 8.

Referring to the further embodiment shown in FIGS. 11 and 12, the closure member 60, while being formed from the same general class of material as the above-described closure members 48 and 54, preferably is simply a disc of substantially uniform thickness and the outer diameter of which is preferably slightly greater than the diameter of cavity 12, whereby a firm peripheral seal is established between closure member 60 and the walls of cavity 12, as in regard to the preceding embodiment. However, upon pressure being exerted upon the upper surface of closure member 60, as viewed in FIG. 11, it will be distorted due to the engagement of certain peripheral portions thereof with the projections 50, whereby at least certain portions of the periphery of closure member 60 will be moved away from the walls of cavity 12 to provide discharge passages 62, which, with reference to FIG. 10, will somewhat resemble the discharge passages 58 shown therein with respect to the preceding embodiment, but perhaps not as accented as passages 58. Release of pressure upon the upper surface of closure member 60 will enable it to be self-restored to its initial position, such as shown in FIG. 11.

In regard to the above-described several embodiments of the invention, the means for distorting the closure member and thereby providing discharge passages between certain portions of the periphery thereof and the walls of the cavity 12 have been formed fixedly relative to body 10, the same comprising projections 50 extending radially with respect to the central axis of the body and the discharge opening 16. However, it is also contemplated by the present invention that such distorting means may be formed on the closure member per se, rather than on the tubular body 10, as in the embodiments shown in FIGS. 3–12. Accordingly, several additional embodiments of the invention respectively are shown in FIGS. 13–15 and FIGS. 16 and 17, which include this feature of the invention, as follows.

In the embodiment shown in FIGS. 13–15, the closure member 64 is molded from the same general class of material as the closure members in the above-described embodiments and the upper surface thereof preferably is substantially flat. The lower surface of closure member 64 is formed with a central cup-shaped cavity 66 and a series of radially extending grooves, which, in the specific illustration thereof in the drawings, are substantially V-shaped in cross-section, extend between the periphery of closure member 64 and the wall defining cavity 66.

In the normal position of closure member 64, the periphery thereof has a substantial area in firm, sealing engagement with the walls of cavity 12, it being understood that the outer diameter of the closure member 64 preferably is slightly greater than the diameter of cavity 12 and the material from which closure member 64 is formed is at least slightly compressible. However, when pressure is disposed upon the upper surface of closure member 64, the engagement of the lower surface thereof with the transverse inner surface of end wall 14 of body 10 will cause the closure member 64 to become distorted, as illustrated in exemplary manner in FIGS. 14 and 15, to provide discharge passages 70 between the periphery of the closure member 64 and the walls of cavity 12.

The discharge passages 70 communicate with the spaces 72 between the lower surface of closure member 64 and the inner transverse surface of end wall 14 and the contents of the cavity 12 will pass from said spaces along the radial groove 68, the inner ends of which will communicate with discharge opening 16 in the end portion 38 of body 10 for communication with the hypodermic needle 42. The provision of cup-shaped cavity 66 also facilitates such passage of the contents, as well as the distortion of the closure member 64. Release of pressure upon the upper surface of closure member 64 will enable it to become restored to its operative, sealing engagement with respect to cavity 12, substantially as shown in FIG. 13.

The additional embodiment of closure member shown in FIGS. 16 and 17 is similar to that shown in FIGS. 13–15, except that, in FIGS. 16 and 17, the closure member 74 is substantially flat on top in normal position, while the lower surface thereof is somewhat concaved, as illustrated by the dotted line shown in FIG. 16. The closure member also is provided on its lower surface with a plurality of radial grooves 76, the inner ends of which coincide preferably substantially with the axis of discharge opening 16, whereby said grooves vanish at the inner ends thereof, as can be readily visualized from FIG. 18, which illustrates said groove 76 in plan view.

When pressure is applied against the upper surface of closure member 74, such as by pressing plunger 24 inwardly against the material within cavity 12, it will render the closure member 74 concaved on its upper surface, as shown in exemplary manner in FIGS. 17 and 18, thereby distorting the periphery of the closure member sufficiently to provide discharge passages 78 around the periphery thereof which communicate with the outer ends of the radial grooves 76, the inner ends of said grooves communicating with the discharge opening 16. Hence, material within the cavity 12 thereby is discharged through discharge opening 16 to the needle 42. Also, as in regard to the preceding embodiments, release of the pressure upon the closure member 74 will result in the same being restored substantially to its normal, initial position, such as shown in FIG. 16.

In regard to all of the embodiments described hereinabove, emphasis primarily has been made upon the ability of the closure members of the various embodiments to be distorted when pressure is applied against the upper surfaces thereof, whereby at least portions of the periphery of the closure members are moved away from the cylindrical inner walls of the cavity 12 of the body 10 of the syringe, due to distortion of the closure members by such pressure being exerted against the upper surface thereof. Accordingly, discharge passageways of different types and extents in area are formed for discharge of the contents of the syringe cavity to the needle of the syringe. Immediately upon release of such pressure upon the closure members of said various embodiments, they are restored substantially to their initial, self-closing position to seal any remaining contents of the cavity of the syringe within such cavity and away from the needle and discharge means of the syringe. However, under such circumstances, at least a certain amount of the contents of the syringe will be in contact with the needle and its connecting means, whereby it is not recommended that this condition be permitted to remain for any substantial period of time. However, where a series of injections are to be given within a reasonable time period, such as several hours, reaction between the syringe contents and the needle and its connecting means normally will not occur to any substantial extent during such short interval of time.

In the event the hypodermic syringe embodying the principles of the present invention is to be used for injecting a quantity of material in excess of the normal capacity of the cavity 12 of the syringe, whereby it is necessary to aspirate material into the cavity following injection of the initial charge of material from the cavity, the closure members of the various embodiments described above are capable of permitting such aspiration. It has been found from use of certain models of the present invention that, even though no auxiliary means are provided for distorting the closure members during aspiration, as when the plunger 24 is being pulled from adjacent the discharge end of the body toward the outer end thereof, distortion of at least certain portions of the periphery of the various closure members nevertheless takes place. The exact reason as to why this is accomplished is not definitely known, but it appears that there is sufficient friction between the entire periphery of the closure members and the wall surfaces of the cavity 12 that, when aspirating movement of plunger 24 occurs, the closure members tend to remain adjacent the discharge end of the tubular body 10, even though limited peripheral areas thereof become spaced from the walls of cavity 12 to permit the passage of incoming material through the needle 42, past the closure members, and into the cavity 12 until a desired amount has been aspirated thereinto, in accordance with the capacity of the cavity.

From the foregoing, it therefore will be seen that the present invention provides a number of different embodiments of disposable hypodermic syringe constructions primarily utilizing imperforate closure means normally positioned in the lower or discharge end of the tubular body of the syringe and operable to seal the contents of the syringe out of contact with the needle and its connecting means, whereby no reaction can take place between the latter and such material while the loaded or charged syringe is being stored, for example. However, when the contents of the syringe are to be either partially or completely injected, it is only necessary to exert pressure upon the plunger of the syringe to effect highly satisfactory discharge of the contents of the syringe through the conventional needle thereof without rupturing the closure means in any way. Upon completion of a desired injection, releasing pressure upon the plunger of the syringe will enable the imperforate closure means normally to be self-restored to sealing engagement adjacent the discharge end of the syringe, quickly and automatically. If a portion of the original contents of the syringe still remains and a further injection is desired, it is only necessary to insert the needle and again place pressure upon the plunger of the syringe, in the manner described above.

Figure 2:
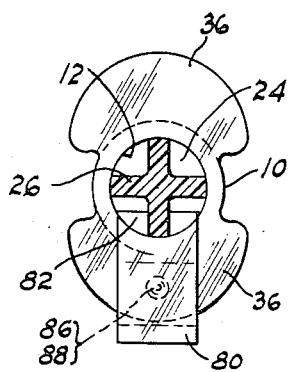
FIG. 2 is a transverse sectional view of the syringe shown in FIG. 1, but on a larger scale than employed in FIG. 1, as seen on the line 2—2 of FIG. 1.

In order to insure against accidental discharge of the contents of the body 10 of the syringe, the present invention contemplates the use of releasable safety latch means, one simple embodiment of which is illustrated in FIGS. 1–3. Referring to these figures, it will be seen that one of the laterally extending flanges 36 supports a slidable, U-shaped latch 80, which may be formed from resilient synthetic resin, metal, or the like. The latch preferably frictionally receives the flange 36 between the legs thereof and one leg of the latch is longer than the other to provide a locking projection 82, which is receivable within a transversely extending notch 84 formed in the plunger rod 26, as clearly shown in FIGS. 1 and 3.

Any suitable type of releasable retaining means to maintain the latch 80 in its latching position, such as shown in FIG. 1, may be utilized. One suitable retaining means comprises a detent 86 formed on the inner surface of one leg of the latch 80 for reception within depression 88 formed in one surface of the flange 36. The inherent resilience of the latch 80 will permit quick withdrawal of the latch 80 from its latched position shown in FIGS. 1 and 2, to its unlatched position shown in FIG. 3, simply by overcoming the restraining effect afforded by the engagement of the detent 86 in depression 88. Since the primary purpose of latch 80 is to prevent accidental initial discharge of the aseptically stored contents of cavity 12 of the body 10, the safety latch 80 may be removed from its latching position and discarded entirely when an injection is to be made with the syringe, particularly since the syringe primarily is intended to be of the disposable type.

While the invention has been described and illustrated in its several preferred embodiments, it should be understood that the invention is not to be limited to the precise details herein illustrated and described, since the same may be carried out in other ways falling within the scope of the invention as claimed.

I claim:

1. A disposable hypodermic syringe comprising an elongated tubular body of substantially uniform cross-sectional shape, defined by an uninterrupted cylindrical surface between the opposite ends thereof, one end of said body having an end wall fixed thereto and provided with passage means through which contents of said body may be discharged and aspirated and to which a hypodermic needle is attachable, said end wall having radial projections which slope upwards from the passage means extend to the inside wall of the tubular body the opposite end of said body being open and receiving a piston which is slidably mounted within said body, and a rod connected to said piston and extending through said open end of said body to effect reciprocation of said piston in opposite directions within said body, in combination with an imperforate closure means mounted within said body adjacent said one end thereof and at the periphery thereof being substantially cylindrical and of uniform width throughout its circumference and sealingly engaging the interior walls of said body to prevent contact of contents of said body with the passage means on one end of said body until discharge of said contents is desired, said closure means being of such thickness and flexibility that positive pressure upon the piston will cause the closure means to engage the said projections so as to effect separative movement of at least part of the periphery of said imperforate closure means laterally away from the interior walls of said body and thereby permit either discharge or aspiration of material through said passage means in said one end of said body and past said closure means.

2. The syringe set forth in claim 1 further characterized by said flexible closure means being thinner in the central portion thereof than at the periphery, thereby to facilitate contraction of said periphery by the application of pressure against said thinner central portion of said closure means.

References Cited

UNITED STATES PATENTS 3,075,525    1/1963    McConnaughey    128—218
2,607,341    8/1952    Brown    128—218

RICHARD A. GAUDET, *Primary Examiner.*

ROBERT E. MORGAN, *Examiner.*

D. L. BAKER, D. S. BURKS, *Assistant Examiners.*